United States Patent [19]

Houle

[11] Patent Number: 4,707,313
[45] Date of Patent: Nov. 17, 1987

[54] METHOD OF MAKING A LAMINATED STRUCTURE FOR USE IN AN ELECTRICAL APPARATUS

[75] Inventor: Timothy H. Houle, Wauwatosa, Wis.

[73] Assignee: A. O. Smith Corporation, Milwaukee, Wis.

[21] Appl. No.: 881,256

[22] Filed: Jul. 2, 1986

[51] Int. Cl.⁴ .................... B05D 5/12; B29C 41/22; B32B 7/10

[52] U.S. Cl. .................................. 264/61; 29/609; 156/82; 156/89; 156/245; 164/6; 164/91; 164/94; 164/461; 164/465; 264/80; 264/104; 264/219; 264/220; 264/255; 264/318; 264/DIG. 57; 264/DIG. 72; 427/104; 427/105; 427/123; 427/126.3; 427/126.4; 427/404; 427/405; 427/419.2; 427/419.3; 427/419.6; 427/422; 427/423; 427/427

[58] Field of Search .................. 264/40.1, 60, 61, 80, 264/81, 219, 220, 221, 225, 255, DIG. 57, DIG. 72, 104, 272.19, 272.2, 318, 24; 156/82, 89, 245; 164/6, 15, 34, 35, 36, 91, 94, 133, 461, 465; 427/14.1, 37, 104, 105, 123, 126.3, 126.4, 126.6, 279, 287, 328, 330, 376.6, 376.7, 376.8, 376.2, 376.3, 376.4, 376.5, 383.5, 383.7, 404, 405, 419.2, 419.3, 419.4, 419.6, 422, 423, 427; 29/609

[56] References Cited

U.S. PATENT DOCUMENTS

| | | | |
|---|---|---|---|
| 3,018,520 | 1/1962 | Renaud | 264/DIG. 72 |
| 3,549,784 | 12/1970 | Hargis | 264/60 X |
| 3,681,132 | 8/1972 | Pammer et al. | 264/81 X |
| 4,050,956 | 9/1977 | de Bruin et al. | 156/89 X |

*Primary Examiner*—Jeffery Thurlow
*Assistant Examiner*—Leo B. Tentoni
*Attorney, Agent, or Firm*—Andrus, Sceales, Starke & Sawall

[57] ABSTRACT

A method of making a laminated structure for use in an electrical apparatus. A female mold is produced having an upwardly facing cavity of a shape corresponding to the laminated structure. A layer of a ferrous metal is sprayed onto the bottom surface of the mold and subsequently an electrically insulated layer is applied to the layer of metal. Alternate layers of the ferrous metal and the insulating layer are deposited in the cavity of the mold to provide a laminated structure in which the metal and insulating layers are integrally bonded together. Through use of the method of the invention, a ferrous metal with the most desirable electrical characteristics can be employed.

3 Claims, 3 Drawing Figures

METHOD OF MAKING A LAMINATED STRUCTURE FOR USE IN AN ELECTRICAL APPARATUS

BACKGROUND OF THE INVENTION

Laminated structures for use in motors and other electrical apparatus have traditionally been formed by stamping laminations from ferrous metal. In the conventional process of producing laminations, the stamping operation controls the metallurgy, for it is necessary that a relatively high carbon steel be used in order to eliminate the formation of burrs during stamping. If a low carbon steel is utilized, burrs will be formed which can cause electrical shorting between adjacent laminations in the electrical apparatus and thus result in substantial eddy current losses.

In the traditional process, the high carbon steel laminations are heat treated after stamping to reduce the carbon content and develop an oxide coating. The laminations are then coated with a resin or varnish and assembled into the laminated structure which is baked at an elevated temperature in order to bond the laminations together.

Because of these operations, the traditional method of forming a laminated structure is labor intensive. The stamping operation not only results in substantial scrap loss, but the stamped laminations require heat treatment to reduce the carbon content and produce an oxide coating. Further cost is added to the final product through the varnishing and baking of the laminated structure.

SUMMARY OF THE INVENTION

The invention is directed to an improved method of forming a laminated structure for use in an electrical apparatus, such as a motor. In accordance with the invention, a female mold is produced having a cavity shaped in accordance with the laminated structure to be formed. A layer of a ferrous metal is sprayed by thermal or plasma arc spraying techniques onto the bottom surface of the mold cavity, and the sprayed metal layer will generally have a thickness in the range of about 0.001 to 0.050 inches. Subsequently an insulating coating is applied to the sprayed metal layer either by oxidizing the surface of the metal layer through a flame, or applying a separate coating of an electrically insulating material, such as aluminum oxide, to the metal layer.

Additional metal layers and insulating layers are then applied in alternate relation to build the laminated structure which can then be removed from the mold.

The method of the invention has distinct advantages over the prior stamping methods of producing laminations. As a prime advantage, the sprayed metal can be a ferrous metal with the most desirable electrical characteristics, such as for example pure iron. Using a stamping method, it is necessary to utilize a high carbon steel to prevent the formation of burrs and the high carbon content is then reduced during the heat treatment. Even with the heat treatment, the heat treated steel does not possess optimum electrical characteristics.

In the laminated structure of the invention, the metal and insulating layers are integrally bonded together so that the varnish and baking treatment required with stamped laminations is eliminated.

Through an automatic programmed spraying mechanism the thickness of both the metal and insulating layers can be accurately controlled.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
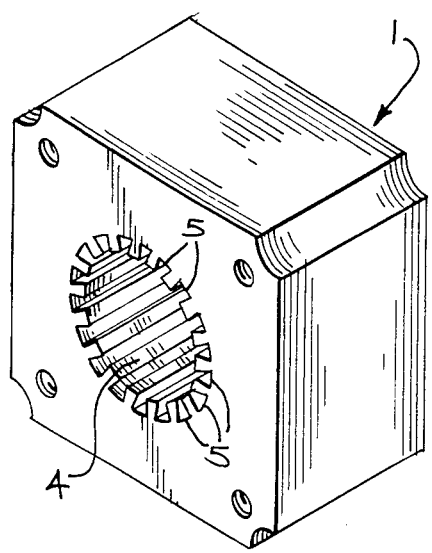
FIG. 1 is a perspective view of a laminated structure produced by the method of the invention.

FIG. 1 shows a laminated structure 1 produced by the method of the invention. As illustrated, the laminated structure 1 is a stator for an electric motor, but it is contemplated that the laminated structure can be employed in a wide variety of other electrical products such as transformers, recorder heads and the like.

The laminated structure 1 is composed of a plurality of layers 2 of a ferrous metal separated by layers of an insulating material 3. The metal layers 2 can be either pure iron or steel with the particular composition of the metal depending on the desired electrical characteristics and the use of the laminated structure.

Insulating layers 3 can either be iron oxide formed by oxidizing the surface of the ferrous metal layers 2, or insulating layers 3 may take the form of separate layers of a electrically insulating or ceramic material, such as a aluminum oxide or zirconium oxide.

Laminated structure 1, as illustrated in the drawings, includes a central opening 4, and a plurality of radially extending slots 5 for electrical windings communicating with the central opening.

Figure 2:
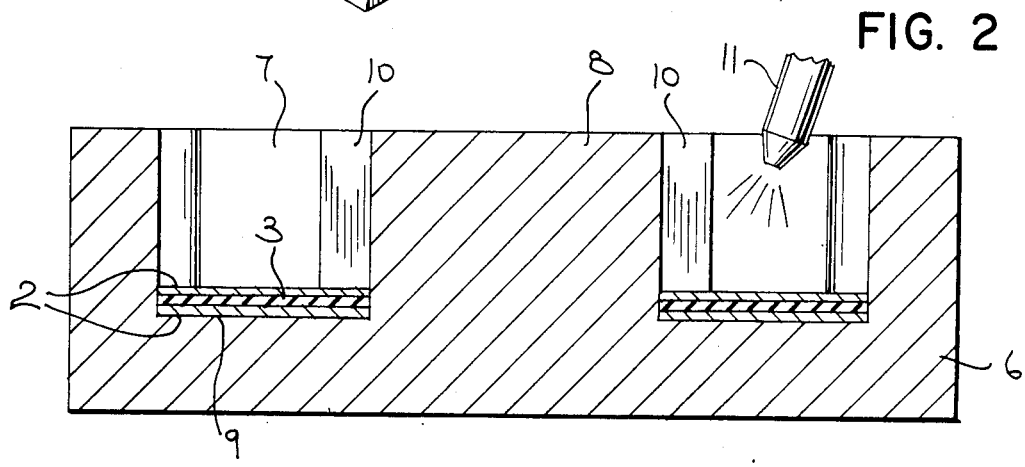
FIG. 2 is a vertical section of a female mold showing the laminated structure being produced.
Figure 3:
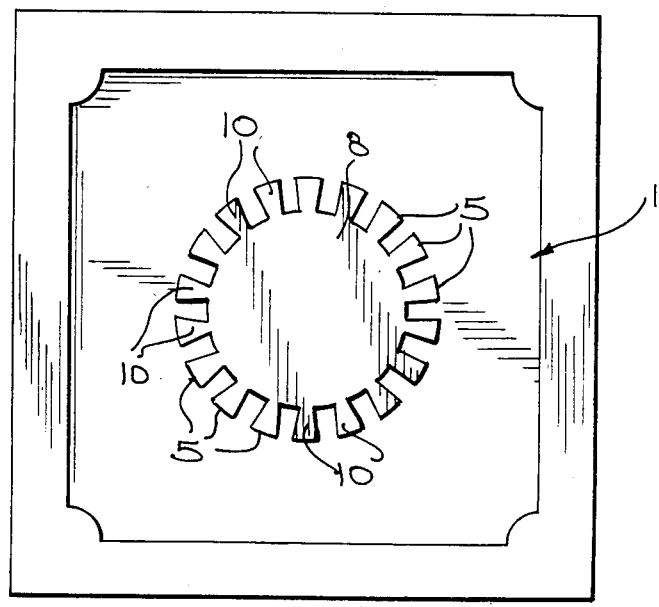
FIG. 3 is a top view of the mold.

To produce the laminated structure 1, a female mold 6 is formed having a central cavity 7 that conforms in shape to laminated structure 1. As shown in FIGS. 2 and 3 mold 6 is provided with a central upstanding column 8 which extends upwardly from the bottom 9 of the mold and a plurality of radial ears 10 extend outwardly from the central column.

To produce the laminated structure 1, a layer 2 of metal is initially applied to the bottom of the mold by a conventional plasma arc or thermal spray gun 11. The metal spraying operation is in itself conventional and is perferably automated so that a uniform layer of metal having a thickness in the range of 0.001 to 0.050 inches can be applied to the bottom 9 of the mold.

After the application of the first metal layer 2, insulating layer 3 is formed either by oxidizing the upper surface of the initial layer 2 through use of a flame or torch, or alternately, a layer of a ceramic or electrically insulated material, such as aluminum oxide or zirconium oxide, can be applied by conventional plasma arc or thermal spraying methods to the layer 2.

The operations of applying alternate layers of metal 2 and insulating material 3 are repeated until the laminated structure of desired height or thickness is achieved. The laminated structure 1 is then removed from mold 6.

Through use of the invention, a soft ductile ferrous metal having the most desirable electrical characteristics can be employed as the layers 2 and it is not necessary to heat treat the laminated structure to reduce the carbon content of the metal layers, as in the case of stamped metal laminations.

As a further advantage, the layers 2 and 3 are integrally bonded together, thereby eliminating the need for the varnishing and baking step which is required when using stamped metal laminations.

Various modes of carrying out the invention are contemplated as being within the scope of the following claims particularly pointing out and distinctly claiming the subject matter which is regarded as the invention.

I claim:

1. method of making a laminated structure for use in an electrical apparatus, comprising the steps of forming a mold cavity having a flat bottom surface and a side wall corresponding to the configuration of the laminated structure, spraying a ferrous metal on said bottom surface to form a flat first metal layer that extends continuously across said bottom surface and has a substantial uniform thickness throughout its surface area, spraying an electric insulating material onto the exposed surface of said first metal layer to completely cover said exposed surface and provide an electrically insulating layer, spraying ferrous metal onto the exposed surface of said insulating layer to provide a second metal layer that completely covers the exposed surface of said insulating layer and maintaining said second metal layer out of electrical contact with said first metal layer, repeating the steps of spraying said metal and said insulating material to form a laminated structure of separate alternate metal and insulating layers of desired thickness, and removing the laminated structure from the mold.

2. A method of making a laminated structure for use in an electrical apparatus, comprising the steps of forming a female mold having a flat bottom surface and a side wall corresponding to the configuration of the laminated structure, spraying ferrous metal on said bottom suface to form a flat first metal layer that completely covers said bottom surface, oxidizing the exposed surface of said first metal layer to provide a layer of iron oxide thereon, spraying ferrous metal onto the exposed surface of said iron oxide layer to form a second metal layer that completely covers said iron oxide layer and thereby maintains said second metal layer out of electrical contact with said first metal layer, oxidizing the exposed surface of said second metal layer to provide a layer of iron oxide thereon, repeating the steps of spraying said metal and oxidizing the exposed surface of each metal layer to provide a laminated structure of separate alternate metal and iron oxide layers, and removing the laminated structure from said mold.

3. The method of claim 1, wherein said step of spraying said electrically insulating material comprises spraying a ceramic material.

* * * * *

UNITED STATES PATENT AND TRADEMARK OFFICE
CERTIFICATE OF CORRECTION

PATENT NO. : 4,707,313
DATED : November 17, 1987
INVENTOR(S) : TIMOTHY H. HOULE

It is certified that error appears in the above-identified patent and that said Letters Patent is hereby corrected as shown below:

Col. 3, CLAIM 1, Line 13, Before "method" insert ---A---;
Col. 4, CLAIM 2, Line 11, Cancel "suface" and substitute therefor ---surface---

Signed and Sealed this

Sixth Day of December, 1988

Attest:

DONALD J. QUIGG

Attesting Officer

Commissioner of Patents and Trademarks